United States Patent [19]

Swanson

[11] Patent Number: 5,022,803

[45] Date of Patent: Jun. 11, 1991

[54] PIN TYPE CARBON-CARBON FASTENER

[75] Inventor: Kurt W. Swanson, Kent, Wash.

[73] Assignee: General Dynamics Corporation, Convair Division, San Diego, Calif.

[21] Appl. No.: 528,409

[22] Filed: May 25, 1990

[51] Int. Cl.$^5$ .............................................. F16B 13/04
[52] U.S. Cl. ........................................ 411/19; 411/82; 411/901; 10/1 R; 29/527.2; 29/525.1
[58] Field of Search ................. 411/82, 258, 900, 901, 411/909, 914, 19, 904; 10/1 R; 29/525.1, 527.2

[56] References Cited

U.S. PATENT DOCUMENTS

| 4,687,395 | 8/1987 | Berecz et al. | 411/901 |
| 4,687,397 | 8/1987 | Berecz | 411/901 |
| 4,975,006 | 12/1990 | Swanson | 411/19 |

Primary Examiner—Brooks H. Hunt
Assistant Examiner—Leon Nigohosian, Jr.
Attorney, Agent, or Firm—John R. Duncan; Frank D. Gilliam

[57] ABSTRACT

A method for joining carbon-carbon structural elements together using a carbon-carbon pin type fastener for transfer of shear loads. A coating of powdered metal which undergoes a large expansion when reacted in the presence of a gas is used to coat the outer surfaces of a pin which extends through the structural elements to be joined, with the powdered metal coating between the body of the pin and the surfaces of the structural elements through which the pin passes. After installation through the structural elements the pin is heated in an oxygen atmosphere causing the powdered metal coating to expand up to 100% from its unheated volume binding the pin to the structural elements. A fluted or scalloped edge on the pin increases the surface area of the pin increasing its friction holding force.

16 Claims, 1 Drawing Sheet

PIN TYPE CARBON-CARBON FASTENER

BACKGROUND OF THE INVENTION

The invention is directed to the joining of structural elements and more particularly to the joining of structural elements formed form carbon-carbon composites.

One of the most pressing challenges in the development of carbon-carbon composite material as a structural material for aerospace and other applications, is the joining and fastening of the various elements together.

A common method of joining materials with metal pins is to chill the pins, i.e. shrink the pins, and then insert the pins through tight tolerance apertures. The pins increase in size when returned to ambient temperatures and bind the joined materials to the pin. This type of joinder of carbon-carbon structural materials with a carbon pin cannot be accomplished by this method as the carbon pin remains the same size when chilled or at ambient temperature due to the coefficient of thermal expansion (CTE) of carbon.

U.S. Pat. No. 4,478,544 teaches a deformable reinforced plastic rivet comprising a plurality of substantially continuous carbon fibers encapsulated in a partially polymerized thermoset resin matrix and enveloped in a high tensile strength low modulus tubular sheath. A portion of the rivet is deformable to form a head and fully polymerizable upon heating thereof.

U.S. Pat. No. 4,505,979 teaches a pin for connecting machine parts with one another, which is of optimally light weight, the pin is of a compound structure comprising a core rolled-reinforced synthetic plastics resin and a metallic envelope. A filler of quartz sand or carbon fibers is used. The envelope is preferably seated on the core under circumferential tensile bias. The manufacture of the pin takes place, for example, by pressing the filler and matrix resin system directly into the suitably prepared envelope.

U.S. Pat. No. 4,685,822 teaches a threaded connection between a graphite shaft and a metal shaft, such as is used to drive a rotating nozzle in the refining of aluminum, is strengthened by coating the graphite surface that contact the flange portion of the metal shaft with a refectory cement prior to the fastening of the shafts together. The coating of the graphite shaft serves to greatly strengthen the threaded connection and the ability of the connection to transmit driving torque from the metal shaft to the graphite shaft.

U.S. Pat. No. 4,723,862 teaches a ceramic-metal joint structure. A thin sheet of ceramic material is inserted between the metal and ceramic to be joined, a brazing material is positioned between the thin sheet of ceramic material and metal and ceramic material to be joined. The joint is then sintered.

One of the most pressing and continuing challenges in the development of carbon-carbon composite material as a structural material for aerospace and other applications, is the joining and fastening together of the various elements.

SUMMARY OF THE INVENTION

This invention is directed to the joiner of carbon-carbon composite structural materials. The apparatus and method of the invention uses a carbon fastener preferably constructed of either 2D or 3D carbon. The carbon-carbon structural material to be joined is prepared by providing aligned apertures therethrough. The fastener is coated with a powdered metal preferably metal that expands when heated in a gaseous atmosphere, for example silicon metal, titanium, and aluminum zirconium when heated in an atmosphere of oxygen. The coated fastener is inserted into the aperture through the carbon-carbon structural elements. After properly positioned, the fastener is heated in a gaseous atmosphere at a temperature sufficient to react the metal powder with the gas to expand the powdered metal coating until a solid connection is formed between the fastener and the carbon-carbon structural elements. The closeness of the fit of the coated fastener, the amount of powered metal coating and the duration of heating determine the pressure applied between the carbon-carbon structural elements and the fastener.

An object of this invention is to provide a fastener for fastening together carbon-carbon structural elements in shear in a manner expected for the use of those structural elements.

Another object of this invention is to coat the fasteners with a material that is permanently expandable when heated in a specific gaseous atmosphere.

Still another object of this invention is to provide a fastener for joining carbon-carbon structural elements that is simple to use and economically feasible for the purpose intended.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURES

DESCRIPTION OF THE PREFERRED EMBODIMENTS OF THE INVENTION

Figure 1:
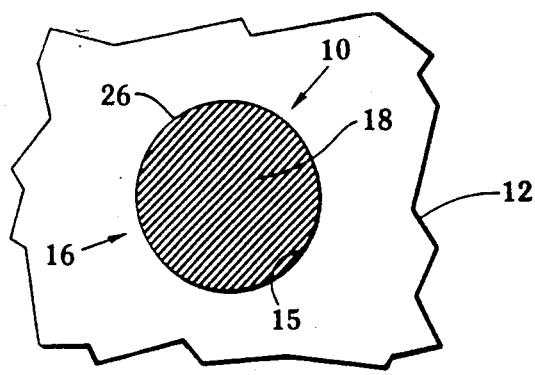
FIG. 1 is a front view of a section of material joined with the fastener of the invention.
Figure 2:
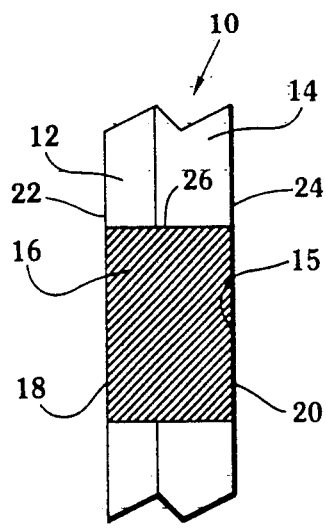
FIG. 2 is a showing of FIG. 1 taken along line 2—2.

The invention is directed to a fastener system 10 for joining together structural material formed from carbon-carbon. Drawing FIGS. 1 and 2 depict one embodiment of the fastener system 10 of the invention. Two pieces of carbon-carbon structural material 12 and 14 are shown in a joined together relationship with a fastener 16 passing through apertures 15 in the structural material 12 and 14. The end surfaces 18 and 20 of the fastener 16 is shown as being flush with the surfaces 22 and 24 of the joined structural material. It should be understood that in most applications this condition will exist; However, in some applications the fastener 16 may extend at each end or from one end only. Positioned around the surfaces of the fastener 16 which contact the surface of the apertures 15 in the structural material 12 and 14 is a layer of a metal powder 26 that will expand when heated in a gaseous atmosphere such as for example, Oxygen or any other gas which will cause a specific metal powder to expand when heated in the presence thereof The joinder of the fastener 16 to the carbon-carbon structural material is accomplished in the following manner. The aligned apertures are provided in the carbon-carbon structural material 12 and 14; The fastener is sized to be inserted into the apertures 15; The fastener is coated with a powdered metal of the type aforementioned prior to being inserted into the apertures 15; After inserting the fastener 15 into the apertures as shown in drawing FIG. 1, the fastener 15 is heated in a gaseous atmosphere, the gas being Oxygen or another gas which causes the powdered metal to expand as aforementioned and bind the fastener 15 to the carbon-carbon structural material to be joined.

Figure 3:
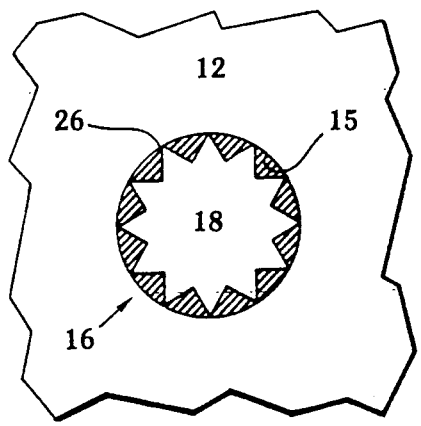
FIG. 3 is a showing similar to the showing of FIG. 1 with a fastener of the invention having a fluted head.

Referring now specifically to drawing FIG. 3, the ends 18 and 20 of the fastener 16 have fluted edges, end 18 being shown. These fluted edges provide an enlarged surface area for the powdered metal to expand and grip the walls of the apertures 15. The fastening system 10 of drawing FIG. 3 is accomplished in the same manner as hereinbefore discussed under the discussion directed to drawing FIGS. 1 and 2.

While there have been shown and described the preferred embodiments of the fastening system in accordance with the invention, it will be appreciated that many changes and modifications may be made therein without, however, departing from the essential spirit thereof.

What is claimed is:

1. A pin fastener system for joining carbon-carbon structural material with aligned apertures therethrough comprising:
    a pin formed of carbon and
    a powdered metal coating covers the pin surfaces in contact with the aperture walls whereby when said pin is heated in a gaseous atmosphere said powdered metal coating expands and fastens said pin to said carbon-carbon structural material.

2. The invention as defined in claim 1 wherein said pin is formed of 2D carbon.

3. The invention as defined in claim 1 wherein said pin is formed of 3D carbon.

4. The invention as defined in claim 1 wherein said powdered metal is Silicon.

5. The invention as defined in claim 1 wherein said powdered metal is Titanium.

6. The invention as defined in claim 1 wherein said powdered metal is Zirconium.

7. The invention as defined in claim 1 wherein said powdered metal is Aluminum.

8. The invention as defined in claim 1 wherein said gaseous atmosphere is Oxygen.

9. The invention as defined in claim 1 wherein the end surfaces of said pin which comes in contact with the aperture in said carbon-carbon structural material are fluted.

10. A method of joining carbon-carbon structure materials comprising the steps of:
    providing a carbon pin;
    coating said pin in the areas that come in contact with said materials to be joined with a metallic powder which expands when reacted with a specific gas;
    providing aligning apertures through said structural materials to be joined;
    passing the pin through said aligned apertures; and
    heating said pin to an elevated temperature in a specific gas whereby said coating expands locking said pin to the walls of said aligned apertures.

11. The method of claim 8 wherein said pin is formed of 2D carbon.

12. The method of claim 8 wherein said pin is formed of 3D carbon.

13. The method of claim 8 wherein said coating is Silicon.

14. The method of claim 8 wherein said coating is Titanium.

15. The method of claim 8 wherein said specific gas is Oxygen.

16. The invention as defined in claim 8 wherein said coating is a powdered metal taken from a group consisting of Silicon and Titanium or a combination thereof.

* * * * *